United States Patent
Ortner et al.

(10) Patent No.: US 10,260,754 B2
(45) Date of Patent: Apr. 16, 2019

(54) ADVANCED ELECTRONIC CONTROL DISPLAY

(71) Applicant: VIKING RANGE, LLC, Greenwood, MS (US)

(72) Inventors: Matthew Ortner, Greenwood, MS (US); Curtis Joseph Vann, III, Greenwood, MS (US)

(73) Assignee: VIKING RANGE, LLC, Greenwood, MS (US)

( * ) Notice: Subject to any disclaimer, the term of this patent is extended or adjusted under 35 U.S.C. 154(b) by 5 days.

(21) Appl. No.: 14/644,547

(22) Filed: Mar. 11, 2015

(65) Prior Publication Data

US 2015/0192302 A1     Jul. 9, 2015

Related U.S. Application Data

(63) Continuation-in-part of application No. 13/547,447, filed on Jul. 12, 2012, now abandoned.

(60) Provisional application No. 61/506,753, filed on Jul. 12, 2011.

(51) Int. Cl.
| | |
|---|---|
| *G06F 3/041* | (2006.01) |
| *A47J 37/06* | (2006.01) |
| *F24C 7/08* | (2006.01) |
| *G06F 3/0484* | (2013.01) |

(52) U.S. Cl.
CPC .............. *F24C 7/085* (2013.01); *F24C 7/086* (2013.01); *G06F 3/04847* (2013.01)

(58) Field of Classification Search
CPC ...................................................... G06F 3/044
USPC ................ 345/1.1–1.3, 156–184; 178/18.06; 324/658, 663
See application file for complete search history.

(56) References Cited

U.S. PATENT DOCUMENTS

| | | | |
|---|---|---|---|
| 3,974,472 A * | 8/1976 | Gould, Jr. | ............... F24C 7/087 219/506 |
| 4,345,145 A * | 8/1982 | Norwood | ............ A47J 37/0623 219/408 |
| 4,418,262 A | 11/1983 | Noda | |
| 4,568,810 A | 2/1986 | Carmean | |
| 4,591,681 A | 5/1986 | Akao | |
| 4,615,014 A | 9/1986 | Gigandet et al. | |
| 5,084,847 A | 1/1992 | Song | |
| 5,515,476 A * | 5/1996 | Nishidai | ............ G05B 13/0275 706/3 |
| 5,731,571 A | 3/1998 | Park | |
| 5,834,745 A | 11/1998 | Aoki et al. | |
| 6,140,621 A | 10/2000 | Ho et al. | |
| 6,256,027 B1 | 7/2001 | Jeong et al. | |
| 6,444,954 B1 | 9/2002 | Blankenship | |
| 6,527,547 B2 | 3/2003 | De Bruin et al. | |

(Continued)

*Primary Examiner* — Prabodh M Dharia
(74) *Attorney, Agent, or Firm* — Baker Donelson; Dorian B. Kennedy

(57) ABSTRACT

A control and display system for an appliance that includes a first interactive display for providing a first electronic control interface, at least one other interactive display for providing an additional electronic control interface and which is positioned proximate the first interactive display, and at least one inactive zone between the first interactive display and the at least one other interactive display. The interactive displays are configured to provide a continuous flow of common information across the inactive zones to give the appearance of a single interactive display.

17 Claims, 10 Drawing Sheets

(56) References Cited

U.S. PATENT DOCUMENTS

| | | |
|---|---|---|
| 6,530,784 B1 | 3/2003 | Yim et al. |
| 6,534,699 B2 | 3/2003 | Wakuda |
| 6,626,013 B2* | 9/2003 | Ohta .................... D06F 39/005 68/12.27 |
| 6,750,433 B2 | 6/2004 | Guenther et al. |
| 6,784,869 B1* | 8/2004 | Clark .................... G06F 3/0481 345/156 |
| 6,991,455 B2 | 1/2006 | Wu |
| 7,002,649 B2 | 2/2006 | Yuuki et al. |
| 7,012,220 B2 | 3/2006 | Boyer et al. |
| 7,111,247 B2 | 9/2006 | Choi et al. |
| 7,269,843 B2 | 9/2007 | Yamaguchi et al. |
| 7,508,354 B1* | 3/2009 | Sanders ................ G06F 3/0488 345/1.1 |
| 7,742,137 B2 | 6/2010 | Adachi et al. |
| 7,821,274 B2 | 10/2010 | Philipp et al. |
| 7,847,904 B2 | 12/2010 | Kimura |
| 7,932,898 B2 | 4/2011 | Philipp et al. |
| 7,952,542 B2 | 5/2011 | Yamashita et al. |
| 8,078,991 B2 | 12/2011 | Kanemitsu |
| 8,136,046 B2 | 3/2012 | Broker et al. |
| 8,253,662 B2 | 8/2012 | Yamazaki et al. |
| 8,325,169 B2 | 12/2012 | Tanikame |
| 8,395,602 B2 | 3/2013 | Akiyama et al. |
| 8,421,715 B2 | 4/2013 | Hayakawa et al. |
| 8,427,514 B2 | 4/2013 | Miura |
| 8,994,713 B2* | 3/2015 | Sirpal .................... G06F 1/1616 345/211 |
| 2001/0022592 A1 | 9/2001 | Alimpich et al. |
| 2002/0059603 A1* | 5/2002 | Kelts .................... G06F 3/0481 725/47 |
| 2002/0092842 A1 | 7/2002 | Loveless |
| 2003/0156074 A1* | 8/2003 | Ranganathan ........ G06F 1/3203 345/1.1 |
| 2005/0176502 A1* | 8/2005 | Nishimura .............. A63F 13/10 463/31 |
| 2006/0009863 A1 | 1/2006 | Lingemann |
| 2006/0077544 A1* | 4/2006 | Stark .................... G02F 1/13336 359/448 |
| 2006/0123053 A1 | 6/2006 | Scannell, Jr. |
| 2006/0176240 A1* | 8/2006 | Nozaki ................ G06F 13/387 345/1.2 |
| 2007/0078733 A1* | 4/2007 | Kumar ............... G06Q 30/0601 705/26.1 |
| 2007/0152975 A1* | 7/2007 | Ogihara .............. G06F 3/04886 345/173 |
| 2007/0300283 A1 | 12/2007 | Yamaguchi et al. |
| 2008/0048046 A1* | 2/2008 | Wagner ................ F24F 11/0012 236/91 R |
| 2008/0110875 A1 | 5/2008 | Fisher |
| 2008/0127065 A1 | 5/2008 | Bryant et al. |
| 2008/0273016 A1* | 11/2008 | Helgesen ............ A47L 15/4293 345/173 |
| 2008/0273079 A1* | 11/2008 | Campbell .............. H04N 7/142 348/14.08 |
| 2008/0303782 A1 | 12/2008 | Grant et al. |
| 2009/0244016 A1 | 10/2009 | Casparian et al. |
| 2010/0017821 A1* | 1/2010 | Leonov ............... H04N 5/44543 725/37 |
| 2010/0155206 A1 | 6/2010 | Arione et al. |
| 2010/0312625 A1 | 12/2010 | Miller et al. |
| 2011/0057861 A1* | 3/2011 | Cok .................... H01L 27/3293 345/1.3 |
| 2011/0115160 A1 | 5/2011 | Snow |
| 2011/0148775 A1* | 6/2011 | Rudolph ................ F24C 7/086 345/173 |
| 2011/0151072 A1 | 6/2011 | Anderson et al. |
| 2011/0199333 A1 | 8/2011 | Philipp et al. |
| 2011/0235549 A1* | 9/2011 | Ahlers ................... H04L 41/08 370/255 |
| 2012/0032981 A1* | 2/2012 | Hackwell ............ G06F 15/0291 345/650 |
| 2012/0048122 A1* | 3/2012 | Dadlani Mahtani ........................ G05B 19/042 99/357 |
| 2012/0122581 A1* | 5/2012 | Campo ................ G07F 17/3202 463/37 |
| 2012/0156344 A1* | 6/2012 | Studor .................... A47J 31/44 426/433 |
| 2012/0191617 A1* | 7/2012 | McIntosh ................ B29D 30/54 705/308 |
| 2012/0284634 A1* | 11/2012 | Sitrick ................ G06Q 10/101 715/751 |
| 2013/0290902 A1 | 10/2013 | Martin et al. |
| 2014/0205726 A1* | 7/2014 | Claesson .............. B67D 1/0021 426/506 |

* cited by examiner

ADVANCED ELECTRONIC CONTROL DISPLAY

RELATED APPLICATIONS

This application is a continuation-in-part of U.S. patent application Ser. No. 13/547,447 filed Jul. 12, 2012, which claims the benefit of U.S. Provisional Patent Application No. 61/506,753, filed Jul. 12, 2011.

TECHNICAL FIELD

The present invention generally relates to an advanced interactive electronic control and display system for appliances. More specifically, the present invention relates to an electronic control and display system for an oven appliance, such as a built-in or similar type oven.

SUMMARY

In one embodiment of the disclosure, a control and display system for an appliance is provided that includes a first interactive display for providing a first electronic control interface, at least one other interactive display for providing an additional electronic control interface and which is positioned proximate the first interactive display, and at least one inactive zone disposed between the interactive displays. The interactive displays are configured to provide a continuous flow of common information across the one or more inactive zones to give the appearance of a single interactive display.

In another aspect of the disclosure, a modular control and display system is provided that includes a frame module having one or more apertures formed therein, a first display module located in an aperture of the frame module that provides a first electronic control interface, and at least one other display module also located in an aperture and proximate to the first display module for providing an additional electronic control interface. The modular control and display system also includes one or more inactive zones between the first display module and the at least one other display module. The modular control and display system further includes a computing device that is in electrical communication with each display module, and which computing device is configured to control the display modules to provide a continuous flow of common information across inactive zones to give the appearance of a single interactive display.

In another aspect of the disclosure, a control and display system for an appliance is provided that includes a first interactive display for providing a first electronic control interface, a second interactive display for providing a second electronic control interface and which is positioned proximate the first interactive display, and a third interactive display for providing a third electronic control interface and which is also positioned proximate the first interactive display. The control and display system also includes a first inactive zone between the first interactive display and the second interactive display and a second inactive zone between the first interactive display and the third interactive display, In addition, the first interactive display, the second interactive display, and the third interactive display are configured to provide a continuous flow of common information across the first inactive zone and the second inactive zone to give the appearance of a single wide-screen interactive display.

BRIEF DESCRIPTION OF THE DRAWINGS

These and various other advantages, features, and aspects of the present invention will become apparent and more readily appreciated from the following detailed description of the embodiments taken in conjunction with the accompanying drawings, as follows.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following description is provided as an enabling teaching of exemplary embodiments of the present invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description shall be interpreted as illustrative of the principles of the embodiments and not in limitation thereof, since the scope of the invention is defined by the claims.

Figure 1A:
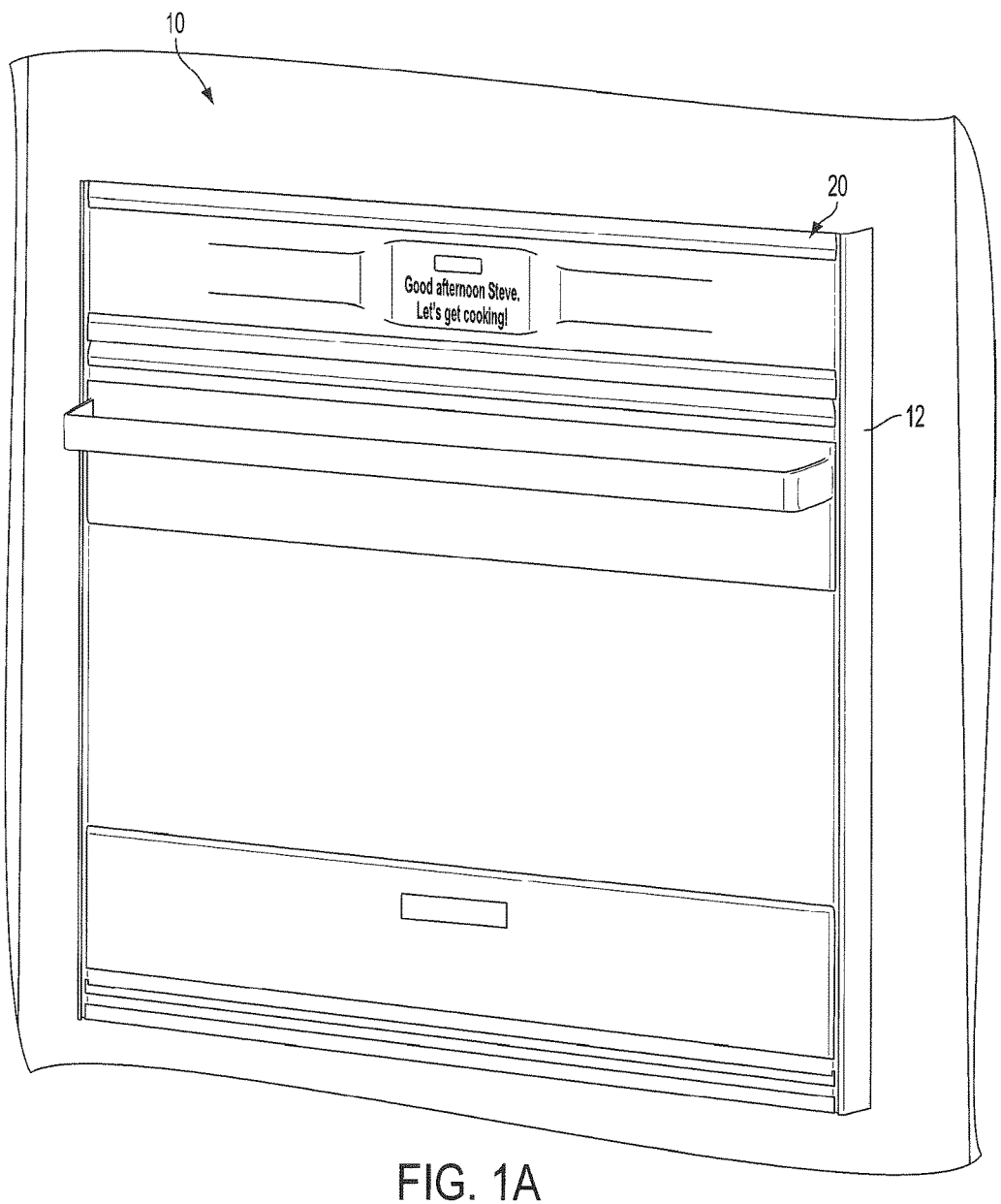
FIG. 1A is a perspective view of an oven appliance having an electronic control and display system, in accordance with a representative embodiment of the present disclosure.
Figure 1B:
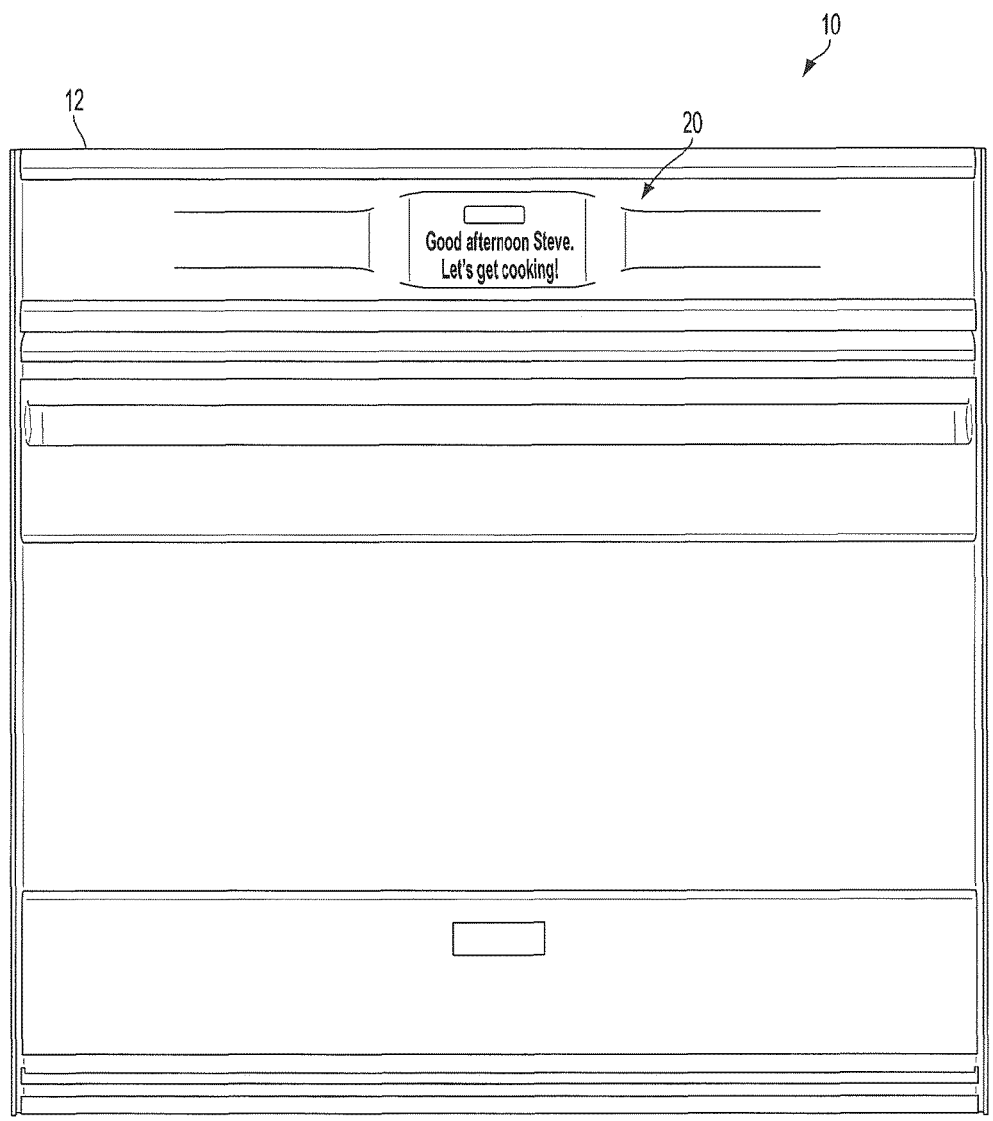
FIG. 1B is a front view of the oven appliance and electronic control and display system of FIG. 1A.
Figure 2:
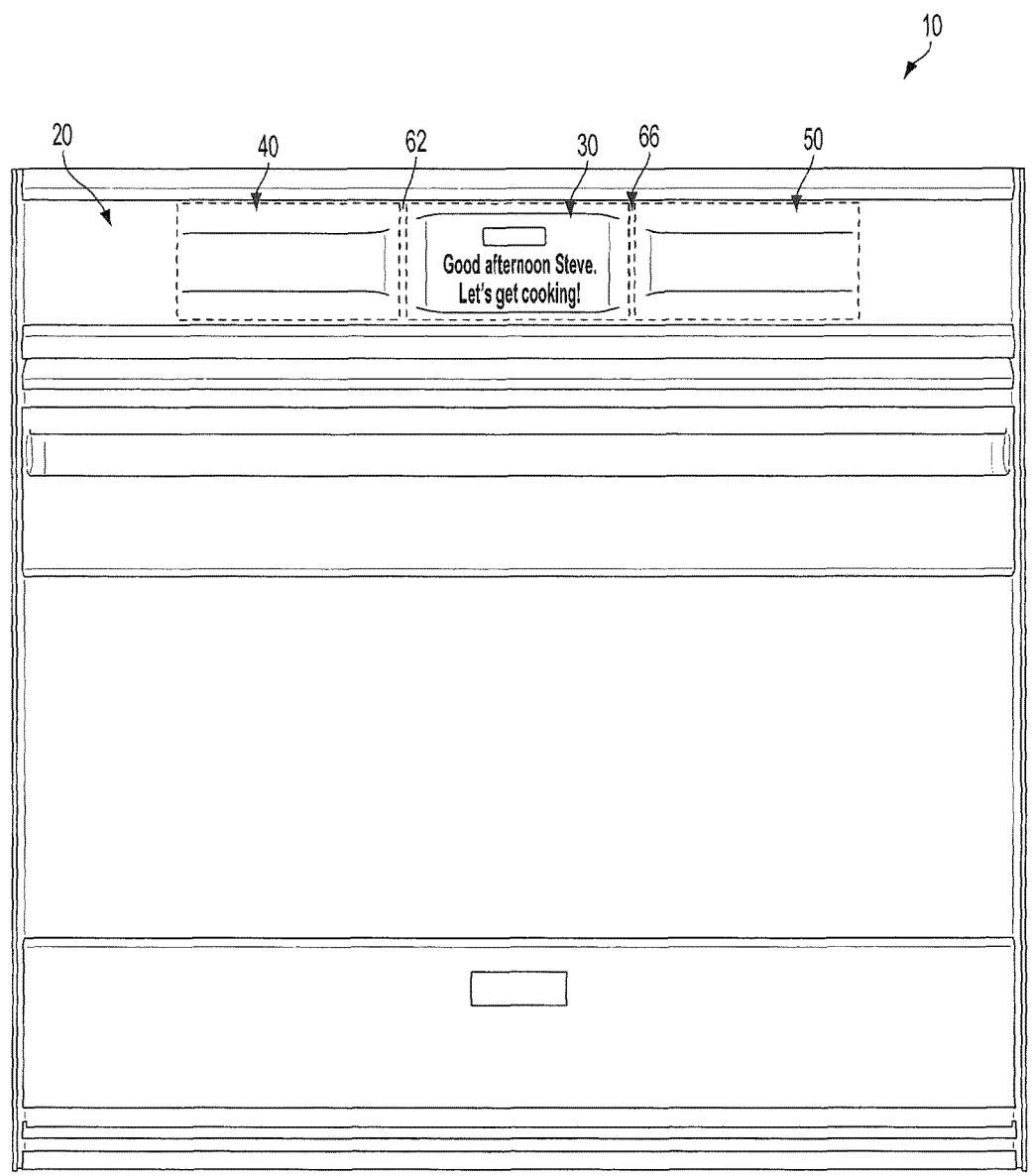
FIG. 2 is another front view the electronic control and display system of FIGS. 1A-1B indicating a plurality of individual screens configured to operate as a single widescreen display.

The present invention relates to an interactive electronic control and display system 20 for appliances 10. As shown in FIGS. 1A and 1B, for example, the electronic control and display system 20 can be used for the operation and control of a built-in oven 12. In other aspects, the electronic control and display system 20 described herein may also be configured for use with another type of cooking appliance, as well as with non-cooking appliances such as dishwashers, clothes washers, clothes dryer, or a variety of other appliances.

Various example features and/or embodiments of the electronic control and display system 20 are shown in FIG. 1A through FIG. 8. In particular, and with reference to FIG. 2, the electronic control and display system 20 can include interactive display units which have been integrated to provide interactive control of the appliance 10. For instance, the electronic control and display system 20 can include a center interactive display unit 30, a left interactive display unit 40, and a right interactive display unit 50, each of which can be independently controllable. Although not intended to be readily apparent to the average user, the display 20 also includes one or more inactive zones located between the interactive displays, such as an inactive zone 62 between the center interactive display unit 30 and the left interactive display unit 40, and an inactive zone 66 between the center interactive display unit 30 and the right interactive display unit 50.

The inactive zones 62, 66 are useful for allowing the electronic control and display system 20 to be subdivided into two or more smaller interactive display units 30, 40, 50, each having a more-standard format or aspect ratio. As a result, the electronic control and display system 20 can be formed from a plurality of lower-cost display units, rather than from a single specially-engineered or high-cost display unit having a unique or non-standard format. Moreover, the smaller interactive display units 30, 40, 50 can be configured to provide a continuous flow of common information across the one or more inactive zones 62, 66 so as to give the appearance of a single interactive display, but at a much lower cost. As used herein the term variable, dynamic or re-configurable electronic control interface or display is intended to denote an electronic display that is capable of changing the message, graphics, or indicia being displayed upon the interface or display, i.e., the display is capable of quickly displaying any number or changing messages, graphics, icons, etc. rather than being programmed or configured to display only one graphic or icon. Such a variable, dynamic or re-configurable display does not include static displays which are programmed, designed, or configured to display one message, icon, or graphic, even if such one message, icon or graphic may be partially illuminated to show a graph, selection of options, on/off feature or the like, such as that shown by displays, switches, or buttons of U.S. Patent Publication No. 2011/0199333 A1 or devices 11-14, graphical icons 81-88, or switches 89-91 of U.S. Patent Publication No. 2008/0110875 A1. As such, a dynamic display is one wherein the display can display any message which is very different from a static display which displays one or a limited number of set graphics.

Figure 3:
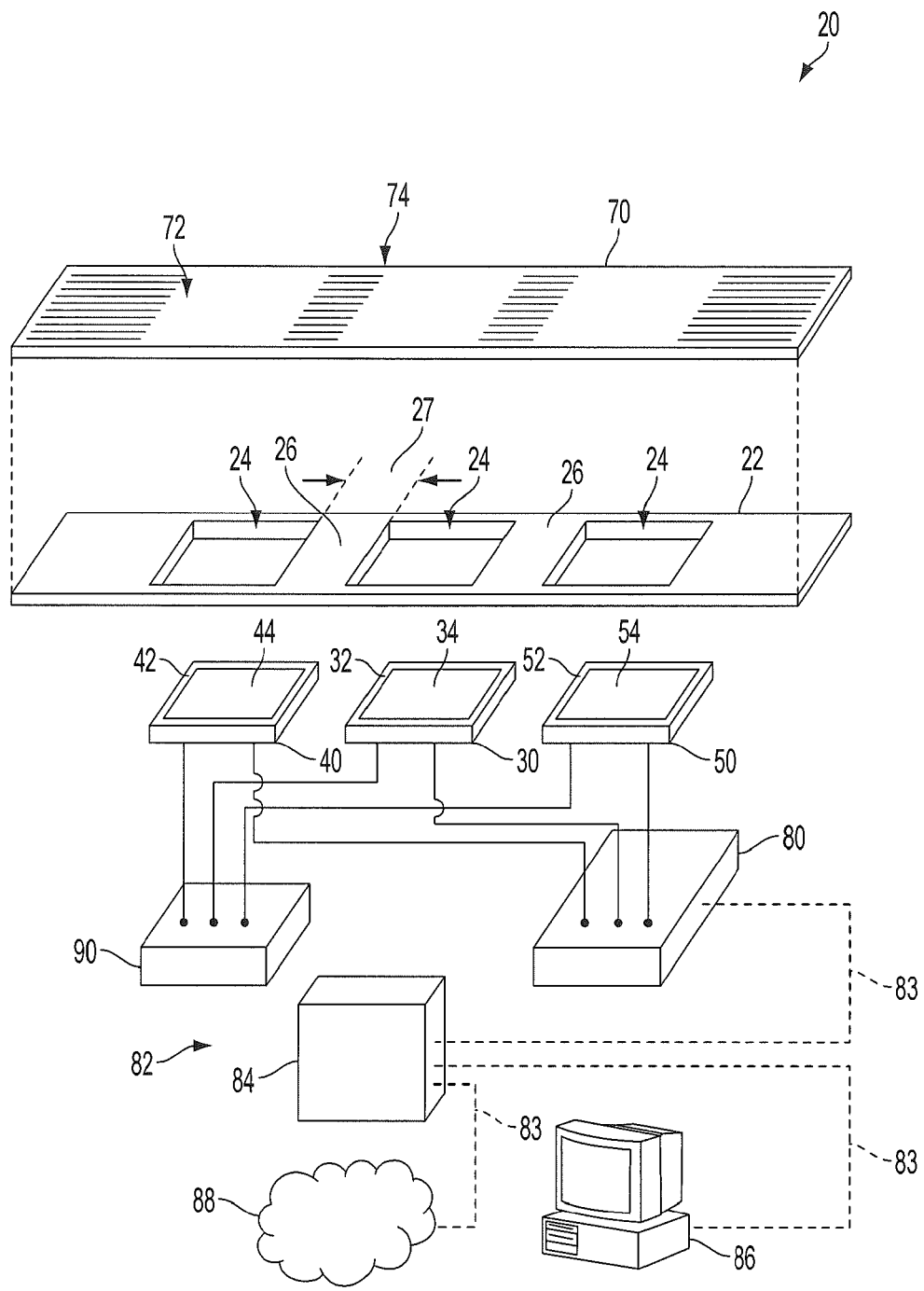
FIG. 3 is an exploded, schematic view of the electronic control and display system of FIGS. 1A-1B, in accordance with a representative embodiment.

In accordance with the representative embodiment, an exploded schematic view of the electronic control and display system 20 is shown in FIG. 3. The system can include a frame 22 having a one or more apertures 24 formed therein and one or more struts 26 which separate the apertures. In one aspect of the disclosure, the struts 26 can form the inactive zones 62, 66 between the three interactive display units 30, 40, 50 which are installed within the apertures 24. However, there is no particular limitation with regards to the width 27 of the struts 26, to the extent that the struts 26 may be so narrow so as to allow the outer rims 32, 42, 52 of the interactive display units 30, 40, 50, respectively, to come into contact with each other and to completely overlap the struts. Alternatively, the frame 22 may include only a single aperture 22 that accommodates all three interactive display units 30,40, 50 at once, and which interactive display units may then only be supported on two edges (e.g. the upper and lower edges of the illustrated embodiment).

In these configurations the outer rims 32, 42, 52 of the interactive display units 30,40,50 themselves may form the inactive zones 62, 66. Accordingly, if the outer rims 32, 42, 52 are also narrow, the inactive zones 62, 66 separating the edges of the light-emitting screens 34, 44, 54 may also be of limited width.

In one aspect, each of the interactive display units 30, 40, 50 can be modular and interchangeable, so that each display unit may be individually replaced without disturbing the other units in the display 20 in the event of a failure. In addition, each of the interactive display units 30, 40, 50 can comprise interactive touch-screens 34, 44, 54 having display screens which are sensitive and response to a user's touch. Although not shown, it is contemplated that the interactive display units 30, 40, 50 can also comprise a row of control buttons positioned adjacent one or more edges of display units having a non touch-sensitive display screen. The display units may still be considered interactive as the functions of the control buttons are re-configurable depending on the electronic control option presented on the display screens.

Each of the interactive display units 30, 40, 50 can be connected to a power supply 90 which provides electrical power to the unit, as well as to a computing device 80 which controls the information presented on the interactive display units and processes the control inputs received from the interactive display units. The computing device 80 can operate to integrate the information presented on the interactive display units 30, 40, 50 so as to provide a continuous flow of common information across the one or more inactive zones to give the appearance of a single interactive display 20. For instance, in one aspect the computing device 80 can allow for the selection of at least one option on the screen of a first display unit and display of an output or other optional selections on the screen(s) of the other display unites).

Generally, in terms of hardware architecture, the computing device 80 includes a processor, memory, and one or more input and/or output (I/O) devices (or peripherals) that are communicatively coupled via a local interface. The local interface can be, for example but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor of the computing device 80 is a hardware device for executing software, particularly that stored in memory. The processor can be any custom made or commercially available processor, a central processing unit (CPU), an auxiliary processor among several processors associated with the computing device, a semiconductor based microprocessor (in the form of a microchip or chip set), a macroprocessor, or generally any device for executing software instructions.

The memory of the computing device 80 can include anyone or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory may incorporate electronic, magnetic, optical, and/or other types of storage media. Note that the memory can have a distributed architecture, where various components are situated remote from one another, but can be accessed by the processor.

The software in the memory of the computing device 80 may include one or more separate programs, each of which comprises an ordered listing of executable instructions for implementing logical functions under the control of a suitable operating system (O/S). The operating system essentially controls the execution of the other computer programs and provides scheduling, input-output control, file and data management, memory management, and communication control and related services. The computing device 80 may also include a basic input output system (BIOS). The BIOS is a set of essential software routines that initialize and test hardware at startup, start the O/S, and support the transfer of data among the hardware devices. The BIOS may be stored in ROM so that the BIOS can be executed when the computing device is activated.

The I/O devices of the computing device 80 may include the interactive display units 30, 40, 50 as well as a network interface controller (NIC) or similar modulator/demodulator for accessing a network or other computer devices.

When the computing device 80 is in operation, the processor is configured to execute software stored within the memory, to communicate data to and from the memory, and to generally control operations of the electronic control and display system 20 pursuant to the software. The O/S may be read by the processor, perhaps buffered within the processor, and then executed. In one embodiment, the computing device 80 for the electronic control and display system 20 can also serve as the controller for the appliance, and may include separate processors, memory, and I/O devices dedicated to that functionality.

Also shown in FIG. 3, the computing device 80 may be connected to a computer network 82, such as a home network 82 which provides interconnection between multiple computer devices through a switch or router 84. The home network can further include on or more general purpose personal computing devices 86 such as a personal computer, a tablet computer, a smart phone having internet networking capabilities, and the like, which are also connected to the router 84 via network connections 83. The network connections 83 can be either wired or wireless. In addition, the home network 82 may also be connected to the internet 88, which can provide access to a wide variety of data and information which can be uploaded to the computing device 80 for use and storage.

In one embodiment, the electronic control and display system 20 can further include a transparent cover 70 which overlies the frame 22 and the interactive display units 30, 40, 50 to provide a seamless top surface 72 which gives the appearance of a single interactive display. The transparent cover 70 can be layer of glass, a polymer film and the like, and can have a thickness and configuration which allows for the touch of a user's finger to be detected with the touch screens 34, 44, 54 of the interactive display units 30, 40, 50 located underneath the transparent cover 70. Alternatively, the transparent cover may also include holes or apertures (not shown) which allow for the passage of the control buttons discussed above. Moreover, additional controls such as dials, knobs, switches or the like also can be provided as needed or desired.

The transparent cover may also be configured to minimize, obscure or hide the presence of the inactive zones 62, 66 between the interactive display units 30, 40, 50. This can be accomplished through the use of surface treatments 74 such as shading, coloring, or etching on the bottom or top surfaces of the transparent cover 80. In one aspect, the surface treatments can interact with the light coming from the screens of the interactive display units 30, 40, 50 below, to provide a diffusing visual affect which obscures the presence of hard edges in the inactive zones 62, 66.

FIGS. 1A-3 show an electronic control and display system 20 in accordance with one embodiment of present disclosure. Specifically, the figures show the electronic control and display system 20 for a built-in oven 12 that incorporates three interactive display units 30, 40, 50 having touch screen capabilities. However, the present invention should not be limited to either oven-type appliances or to the number, type, or arrangement of the interactive display units shown in the figures. For instance, the electronic control and display system for a combined over & under washer/dryer appliance may comprise two or more interactive display units mounted one above the other to better represent the physical configuration of the main washer and dryer components.

The interactive display units 30, 40, 50 of the present electronic control and display system 20 are independently controllable and operable, with the different screens/displays being controlled by one or more processors of the computing device 80 to provide a continuous flow of common information across the one or more inactive zones 62, 66 located between the interactive display units 30, 40, 50, so as to give the appearance of a single interactive display.

Figure 4:
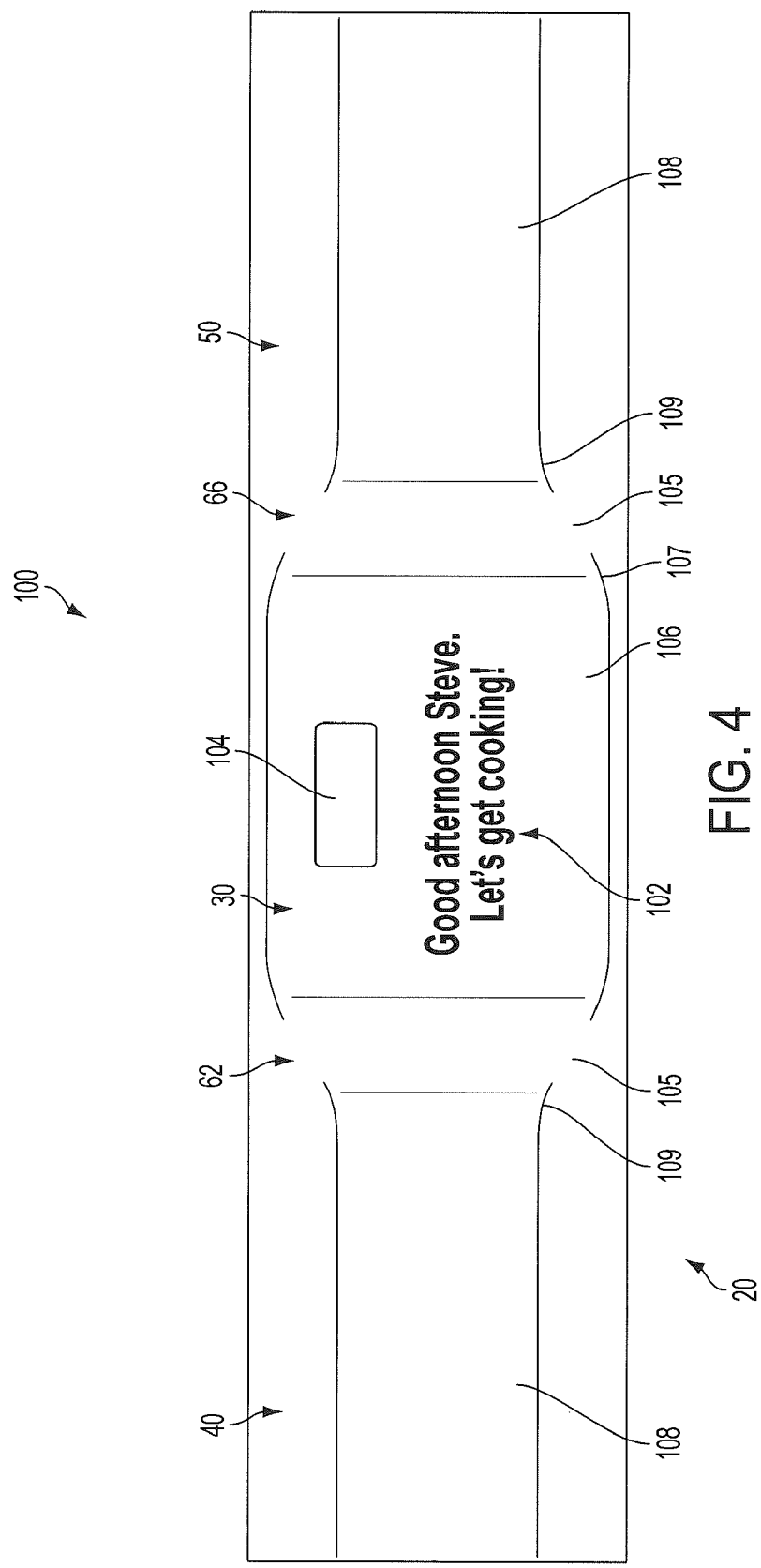
FIG. 4 shows the electronic control and display system of FIGS. 1A-1B with a first exemplary electronic control option.

As shown in FIG. 4, for instance, the electronic control and display system 20 may present an exemplary electronic control option such as a Welcome/Start screen display 100. On the center interactive display unit 30, the Welcome/Start screen display 100 can include a greeting 102, an icon or symbol 104 indicating an active touch location, and which are both surrounded by an interior graphic 106. The left and right interactive display units 40, 50 can display an exterior graphic 108 which compliments the interior graphic 106, and having curved perimeter lines 109 which appear to flow across a gap 105 created by the inactive zones 62, 66 to connect with the curved perimeter lines 107 of the interior graphic 106. Thus, in one aspect 100 the continuous flow of common information across the one or more inactive zones 62, 66 includes a matching set of curved graphics 106, 108 which give the appearance of a single interactive display 20.

Figure 5:
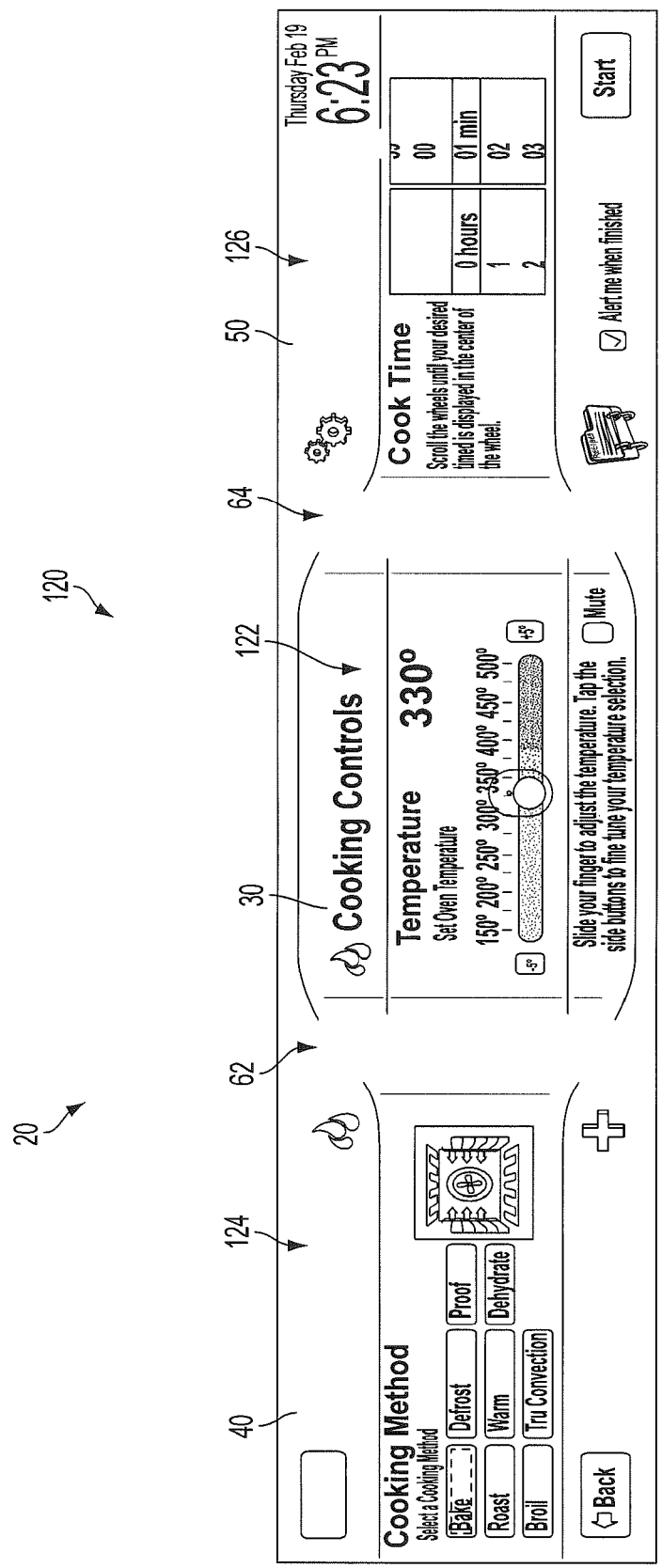
FIG. 5 shows the electronic control and display system of FIGS. 1A-1B with a second exemplary electronic control option.

Referring now to FIG. 5, upon activation the electronic control and display system 20 may present another exemplary electronic control option, such as a Basic Functions display 120. The Basic Functions display 120 can present various operational parameters and/or options for control of the appliance. For example, for use with the oven appliance described in the current embodiment, the center interactive display unit 30 can present an interactive text and graphics display 122 relating to the cooking temperature of the oven (and enable programming or modification thereof). The left interactive display unit 40 can present an interactive text and graphics display 124 relating to different cooking methods and/or information/suggestions for cooking certain foods, and enable the input/selection therefore. The right interactive display unit 50 can present an interactive text and graphics display 126 relating to the input/selection of cooking times, the monitoring internal temperatures of foods being cooked, and/or alert options. Thus, in another aspect 120 the continuous flow of common information across the one or more inactive zones 62, 66 includes related information which pertains to the basic operation and functionality of the appliance, giving the appearance of a single interactive display.

Figure 6:
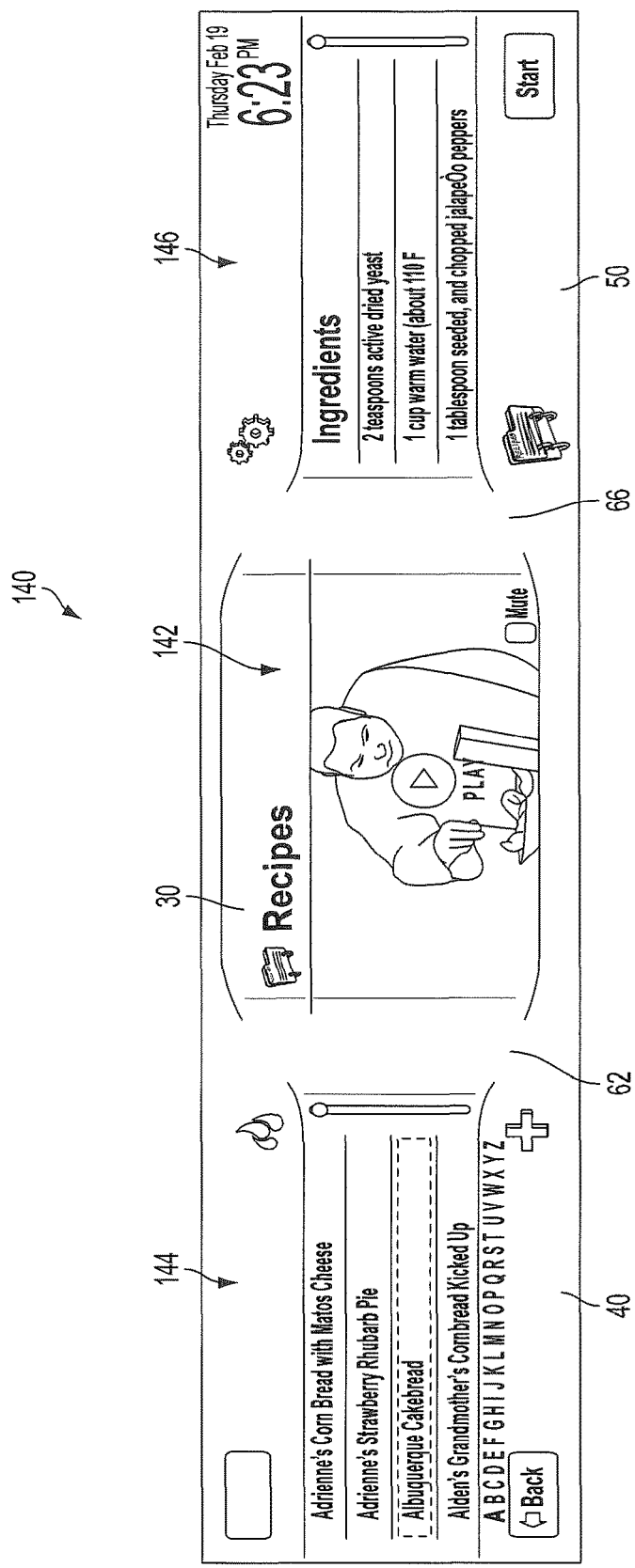
FIG. 6 shows the electronic control and display system of FIGS. 1A-1B with a third exemplary electronic control option.

In another aspect of the present disclosure, the electronic control and display system 20 may be used to present a continuous flow of common information across the one or more inactive zones 62, 66 that includes related media, such as the Cooking Instructions display shown in FIG. 6. For example, the independent control and operation of each interactive display unit 30, 40, 50 enables the user to quickly perform and/or navigate between various functions or actions. This may include selecting or changing a recipe 144 on the left interactive display unit 40, while simultaneously watching a video tutorial 142 of the preparation of the recipe on the center interactive display unit 30, and viewing the ingredients for the recipe 146 being discussed on the right interactive display unit 50. As previously noted, each interactive display unit typically may be a touch-screen so as to enable direct user input of selection(s) displayed thereon (e.g. pausing the video presentation to look more closely at one of the ingredients), while providing a stream-lined, aesthetically pleasing appearance or look to the control system that gives the appearance of a single interactive display.

In addition to the above, each of the interactive display units 30, 40, 50 may can be used to look up and display recipes and even provide audio, text, or other types of tutorials on how to prepare a selected recipe, similar to that shown in FIG. 6.

Figure 7:
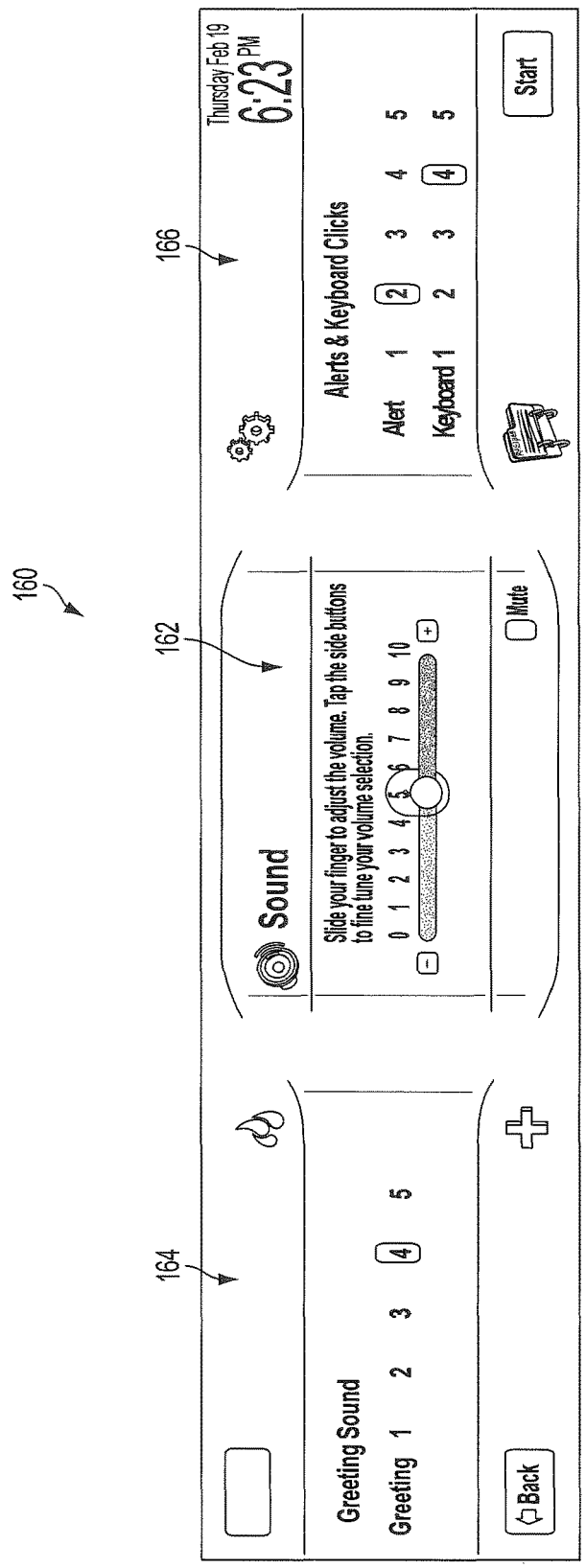
FIG. 7 shows the electronic control and display system of FIGS. 1A-1B with a fourth exemplary electronic control option.

Still further, the various interactive display units 30, 40, 50 can be used to access and modify the settings for the appliance, such the Sound Functions display 160 illustrated in FIG. 7. For example, the Sound Settings display 160 can include an interactive text and graphics display 162 relating to the volume of a particular sound notification, as well as interactive text and graphics displays 164, 166 relating to the section of a greeting sound and the type of alerts or feedback notification when a user touches an interactive display unit, respectively.

Figure 8:
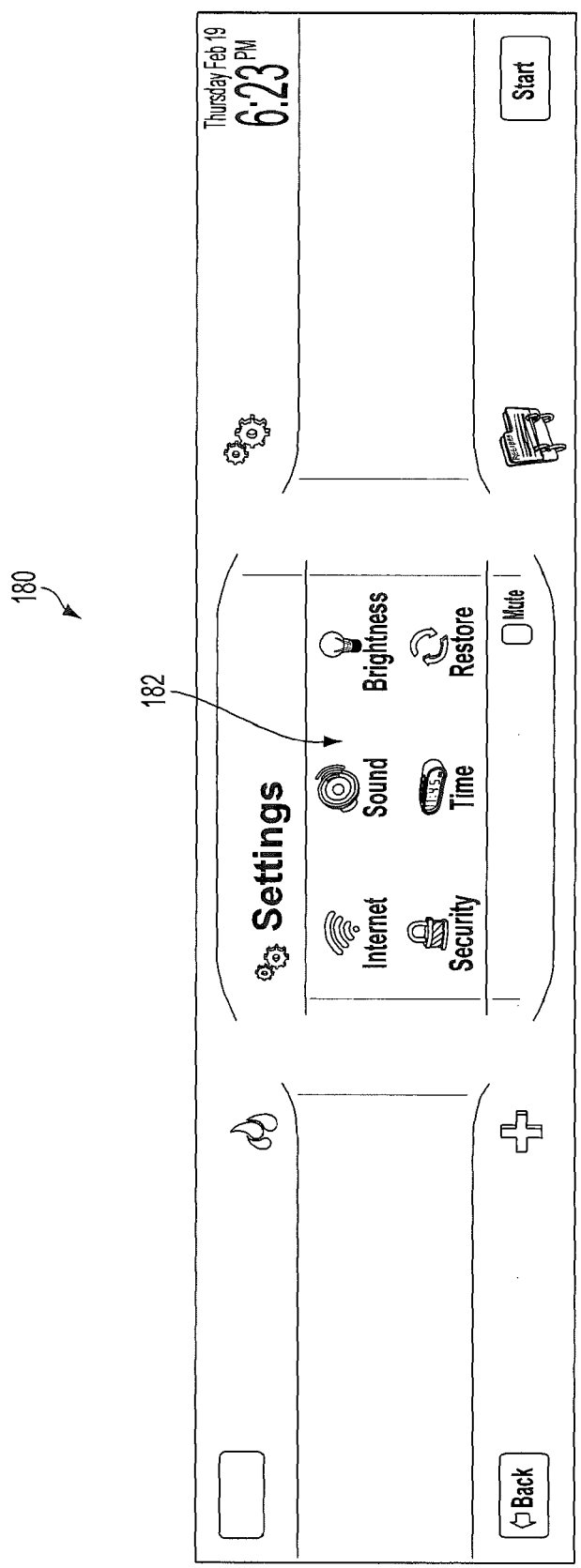
FIG. 8 shows the electronic control and display system of FIGS. 1A-1B with a fifth exemplary electronic control option.
Figure 9A:
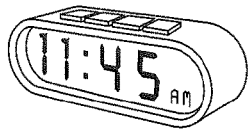
FIGS. 9A-9D show exemplary screen icons.
Figure 9B:
Figure 9C:
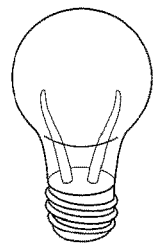
Figure 9D:
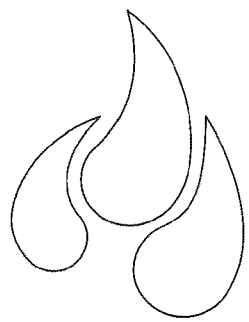

As shown in FIG. 8, access to the Sound Settings display 160 of FIG. 7 can be directed through a Main Settings display 180. By selecting an icon or symbol from the interactive text and graphics display 182, the Main Settings display 180 can also provide access to additional settings displays including internet/network setup, illumination or touch sensitivity levels of the interactive display units or the applicant lighting, security options, clock setup, and even a restore feature which returns all of the settings to the original factory configuration.

FIGS. 9A-9D are representations of some of the symbols or icons which can be included within the electronic control and display system 20 to provide non-textual information regarding the set-up and operation of the appliance. In some aspects, the icons can be programmed and/or user selected for identifying various features (i.e., an oven light or stored recipe file) and/or engaging desired functions with a single touch (i.e., turning on an exhaust fan or the oven light).

Referring back to FIGS. 5-6, in one aspect of the disclosure the appearance and/or functions controlled by the various interactive display units 30, 40, 50 may be selectively modified or customized by the user. For example, while the interactive text and graphics display 122 relating to the cooking temperature of the oven is provided on the center interactive display unit 30, this interactive text and graphics display 122 could be shifted or combined with another interactive display unit on the right or left side thereof. Thus, in one embodiment the user could combine the Basic Functions display 120 (FIG. 5) with the Cooking Instructions display (FIG. 6) so that one interactive display unit presents the cooking temperature and cook time for the food or dish currently in the oven, while another interactive display unit presents a video, audio, or written tutorial on the preparation of the recipe for that dish or for that of a different dish, sauce, etc.

As stated above, while multiple interactive display units 30, 40, 50 are provided, the overall appearance of the electronic control and display system 20 of the present disclosure generally is that of a single interactive wide screen/control. This appearance could be further customizable, moreover, to provide different looks/views, including multiple distinct screens, with different icons, colors, illumination, etc., as needed or desired by the user or customer. The independent control and operation of the different interactive display units 30, 40, 50 of the electronic control and display system 20 can be used to control different aspects or zones of the appliance on which it is used, such as for the control of different cooking zones or ovens and/or a cook-top cooking area of a range or grill, with each cooking zone or area being controlled independently from a single control/display.

The foregoing description of the disclosure illustrates and describes various embodiments of the present invention. While the disclosure shows and describes only selected embodiments of the present invention, it will be understood that the present invention further is capable of use in various other combinations and environments. The present invention is also capable of various changes or modifications within the scope of the inventive concept as expressed herein, commensurate with the above teachings, and/or within the skill or knowledge of the relevant art. It will also be understood that certain features and characteristics of each embodiment may be selectively interchanged and applied to other illustrated and non-illustrated embodiments of the disclosure.

What is claimed:

1. A control and display system for an appliance, comprising:
    a first interactive display for providing a first variable electronic control interface;
    at least one other interactive display for providing an additional variable electronic control interface positioned proximate the first interactive display; and
    at least one inactive zone between the first interactive display and the at least one other interactive display,
    wherein the first interactive display and the at least one other interactive display are configured to provide a continuous flow of common, related information across the at least one inactive zone to give the appearance of a single interactive display.

2. The control and display system of claim 1, further comprising a transparent cover extending over the first interactive display, the at least one inactive zone, and the at least one other interactive display.

3. The control and display system of claim 1, further comprising a third interactive display for providing a third variable electronic control interface arranged proximate to the first interactive display, wherein the first interactive display in combination with the other interactive display and the third interactive display form the appearance of a single wide-screen interactive display, and wherein the first interactive display and the third interactive display has a second inactive zone there between.

4. The control and display system of claim 1, wherein each of the first interactive display and the at least one other interactive display include a touch-sensitive panel display.

5. The control and display system of claim 1, wherein each of the first interactive display and the at least one other interactive display comprise an interchangeable modular display.

6. The control and display system of claim 1, further comprising a frame surrounding and supporting each of the first interactive display and the at least one other interactive display, and wherein the at least one inactive zone comprises an extension of the frame.

7. The control and display system of claim 1, further comprising a computing device in electrical communication with each of the first interactive display and the at least one other interactive display.

8. The control and display system of claim 1, wherein the continuous flow of common information across the at least one inactive zone comprises a curved graphic.

9. The control and display system of claim 1, wherein the continuous flow of common information across the at least one inactive zone comprises related media.

10. The control and display system of claim 9, wherein the related media is selected from the group consisting of related recipe instructions, related cooking and preparation video, and related appliance control options.

11. The control and display system of claim 1, wherein the appliance is an oven.

12. A modular control and display system for an appliance, comprising:
   a frame module having a plurality of apertures formed therein;
   a first display module for providing a first variable electronic control interface and located in a first aperture of the frame module;
   at least one other display module for providing an additional variable electronic control interface and positioned in an aperture of the frame module proximate the first aperture;
   at least one inactive zone between the first display module and the at least one other display module; and
   a computing device in electrical communication with each of the first display module and the at least one other display module,
   wherein the first display module and the at least one other display module are configured to provide a continuous flow of common, related information across the at least one inactive zone to give the appearance of a single interactive display.

13. The modular control and display system of claim 12, wherein the first display module and the at least one other display module are interchangeable.

14. The modular control and display system of claim 12, wherein each the first display module and the at least one other display module include a touch-sensitive panel display.

15. The modular control and display system of claim 12, wherein the at least one inactive zone comprises an extension of the frame module.

16. The modular control and display system of claim 12, wherein the continuous flow of common information across the at least one inactive zone comprises a curved graphic.

17. The modular control and display system of claim 12, wherein the continuous flow of common information across the at least one inactive zone comprises related media.

* * * * *